(12) United States Patent
DiGian, Jr.

(10) Patent No.: US 6,367,407 B1
(45) Date of Patent: Apr. 9, 2002

(54) BACKUP AND PARALLEL PARKING ASSISTANT

(76) Inventor: Vincent A. DiGian, Jr., 867 Penn St., Bryn Mawr, PA (US) 19010

( * ) Notice: Subject to any disclaimer, the term of this patent is extended or adjusted under 35 U.S.C. 154(b) by 0 days.

(21) Appl. No.: 09/520,970

(22) Filed: Jan. 27, 2000

(51) Int. Cl.[7] .............................. B60Q 9/00; B60Q 1/48
(52) U.S. Cl. ........................................... 116/31; 116/56
(58) Field of Search ............................ 116/1, 28 R, 31, 116/35 R, 35 A, 45–47, 50, 56, 201, 327, 328, DIG. 1, DIG. 16; 180/204; 346/8

(56) References Cited

U.S. PATENT DOCUMENTS

| | | | | |
|---|---|---|---|---|
| 1,113,747 A | * | 10/1914 | Boyden | 346/8 |
| 2,598,096 A | * | 5/1952 | Bailly | 346/8 |
| 3,877,410 A | * | 4/1975 | Biven | 116/31 |
| 4,135,594 A | * | 1/1979 | Lestradet | 180/204 |

* cited by examiner

Primary Examiner—Diego Gutierrez
Assistant Examiner—R Alexander Smith

(57) ABSTRACT

An apparatus intended to relay to a vehicle operator the position of the vehicle steering wheels and simultaneously the distance traveled such that the vehicle operator is provided with an accurate guide to precisely move the vehicle through the ideal path for curbside parking. The apparatus is intended to be mounted on the dashboard of the vehicle and connected via cable mechanisms to the steering and drive mechanisms. The apparatus having a fixed cable connected to the steering mechanism the other end of which is connected to a transparent faceplate having a pre-drawn mapping affixed thereon while the drive mechanism having a rotate able cable one end of which is attached to a contact wheel the other attached to a threaded shaft and nut assembly.

1 Claim, 7 Drawing Sheets

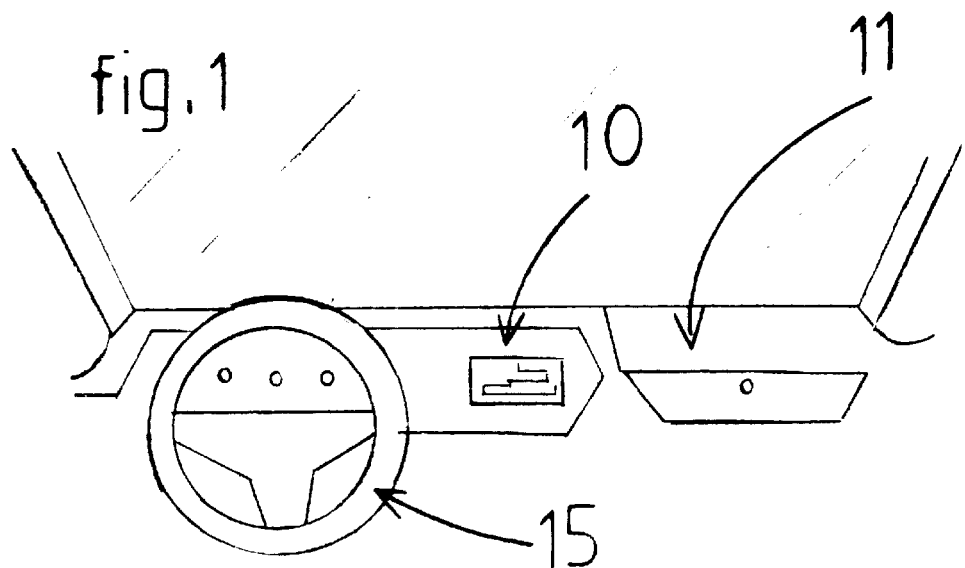
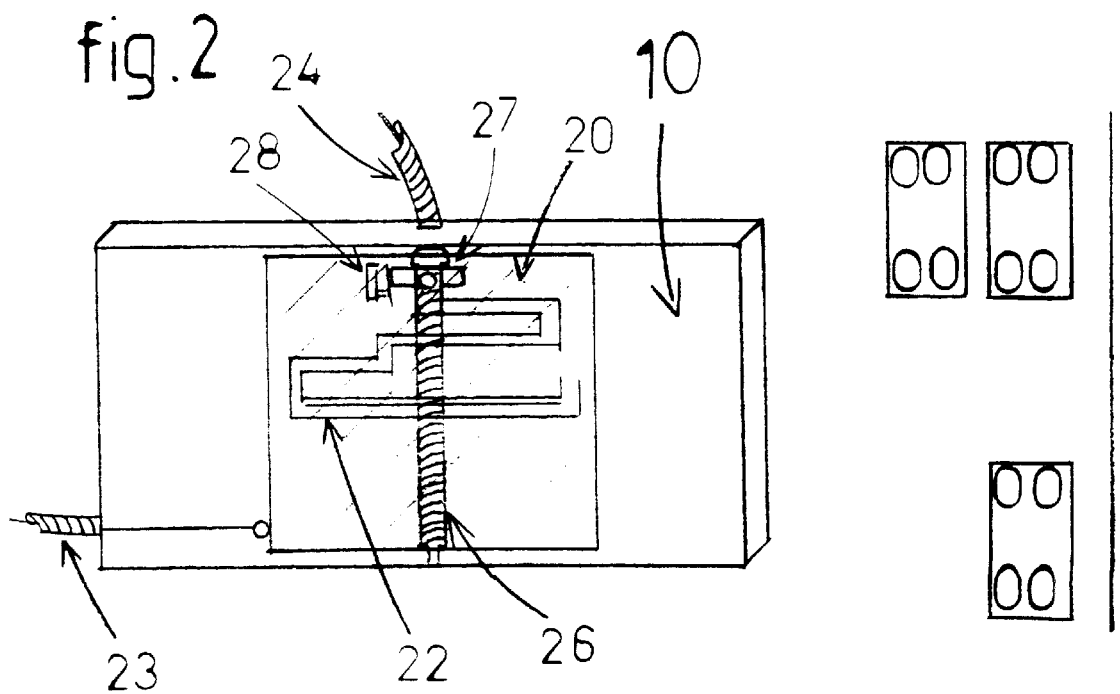

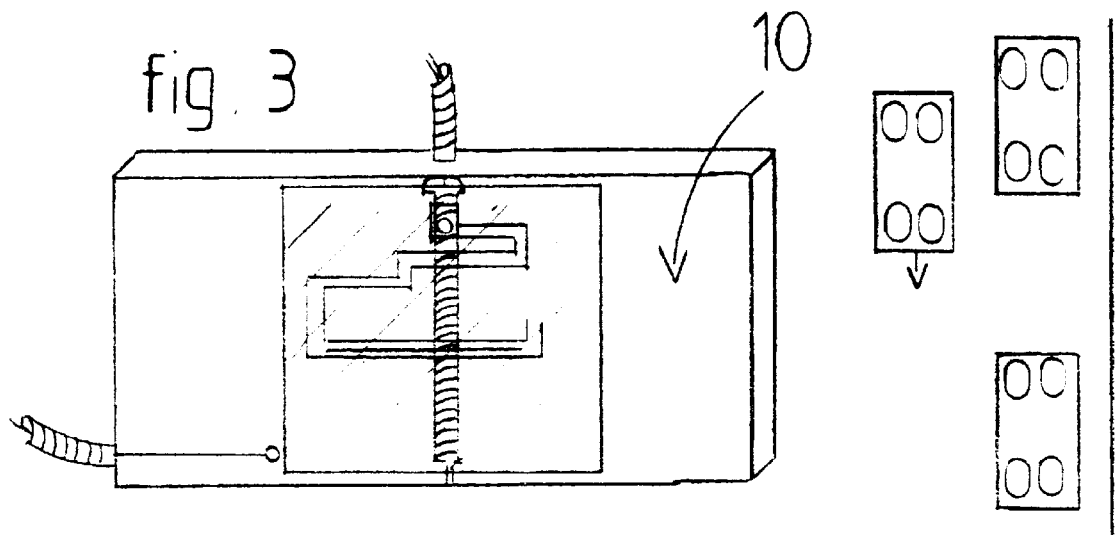
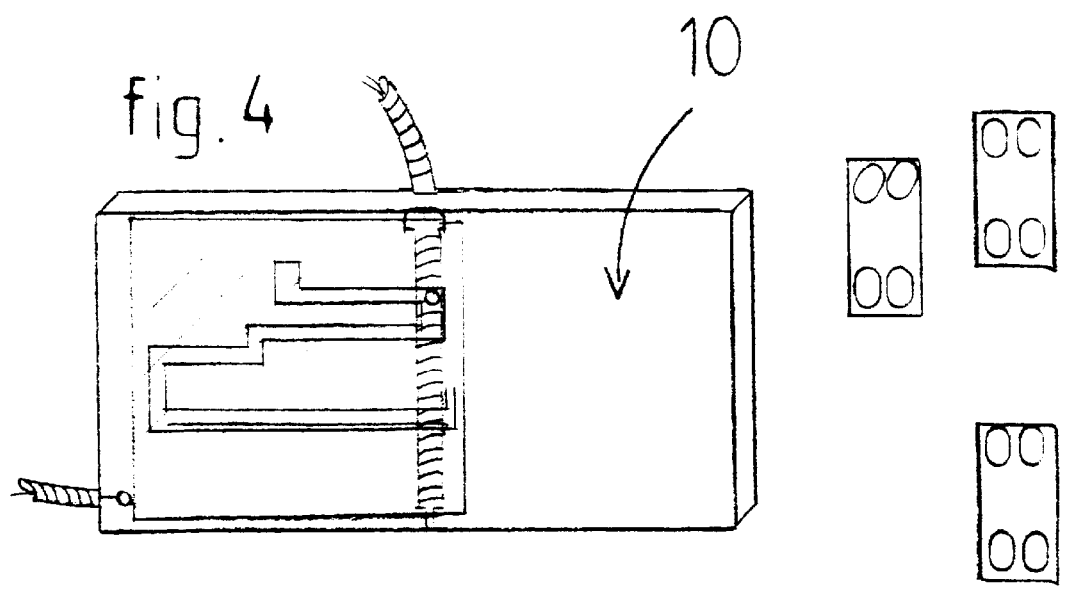

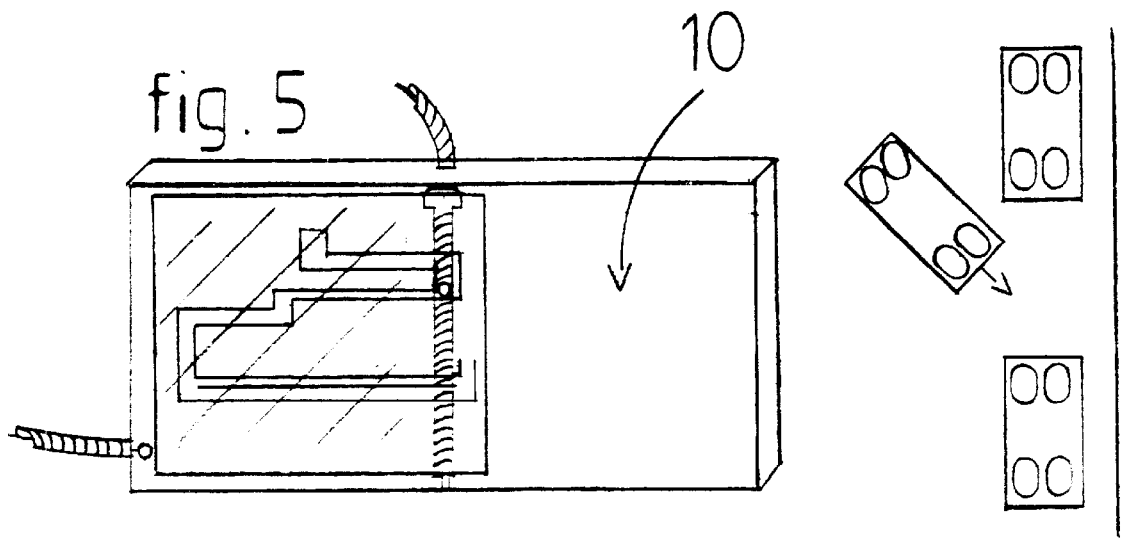
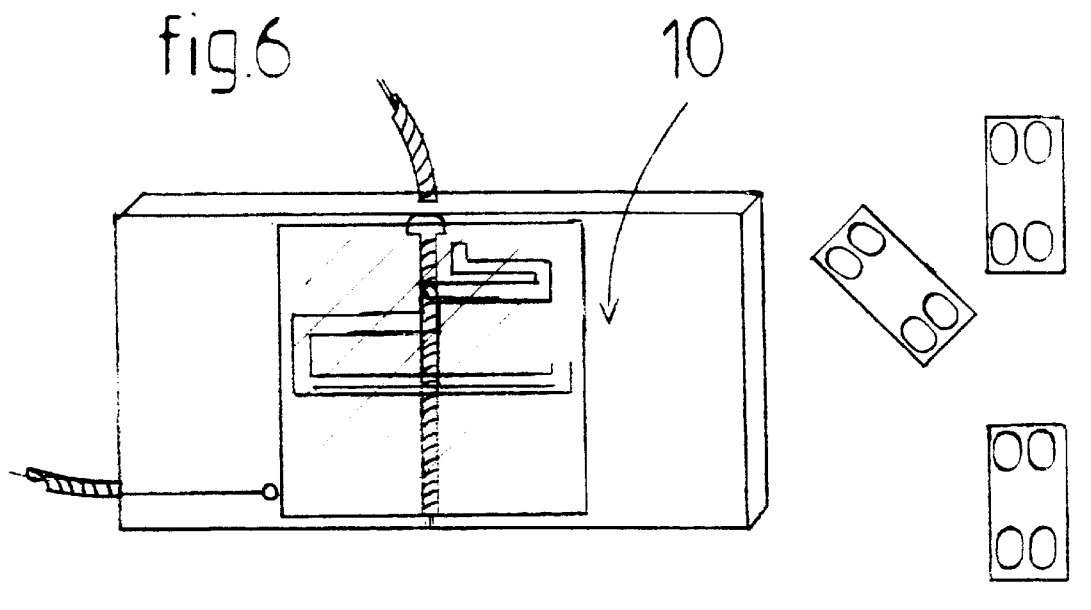

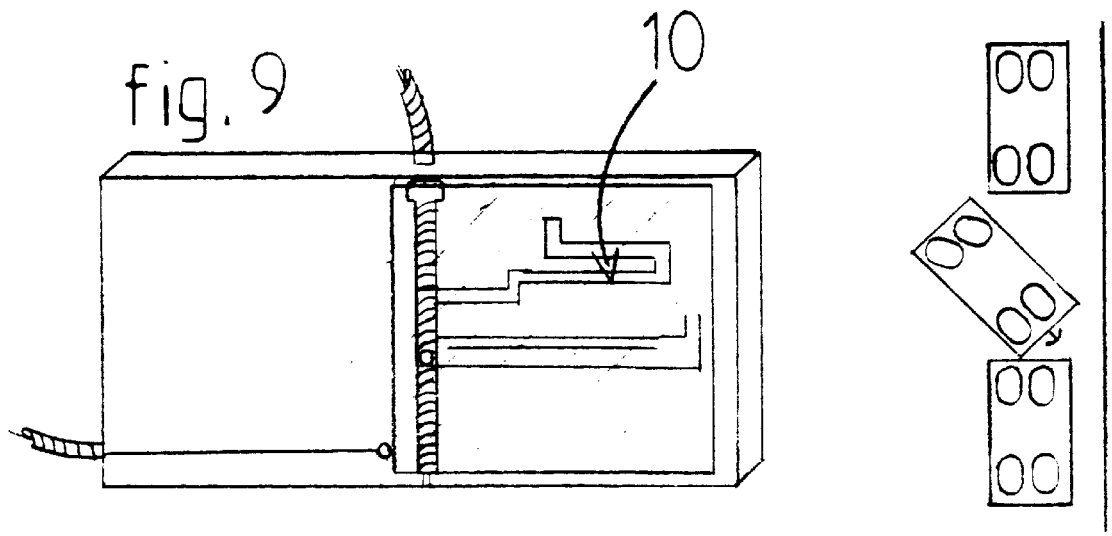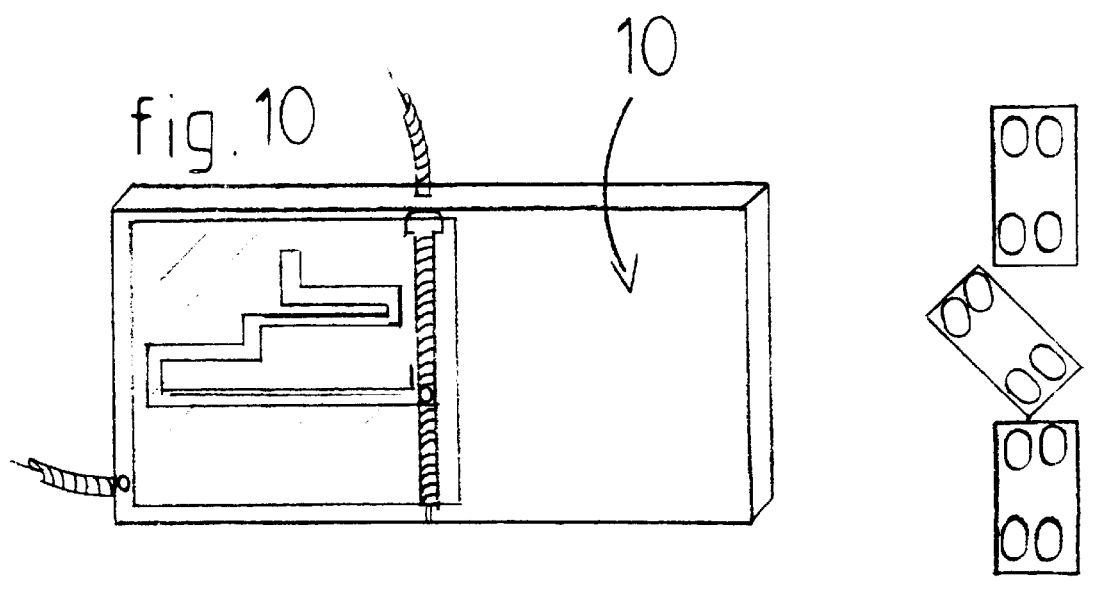

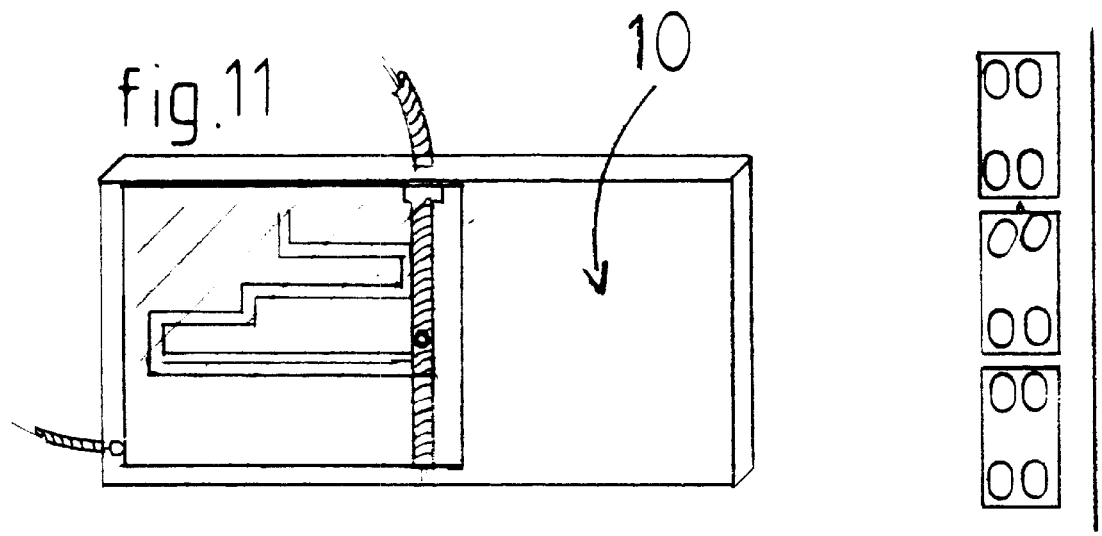
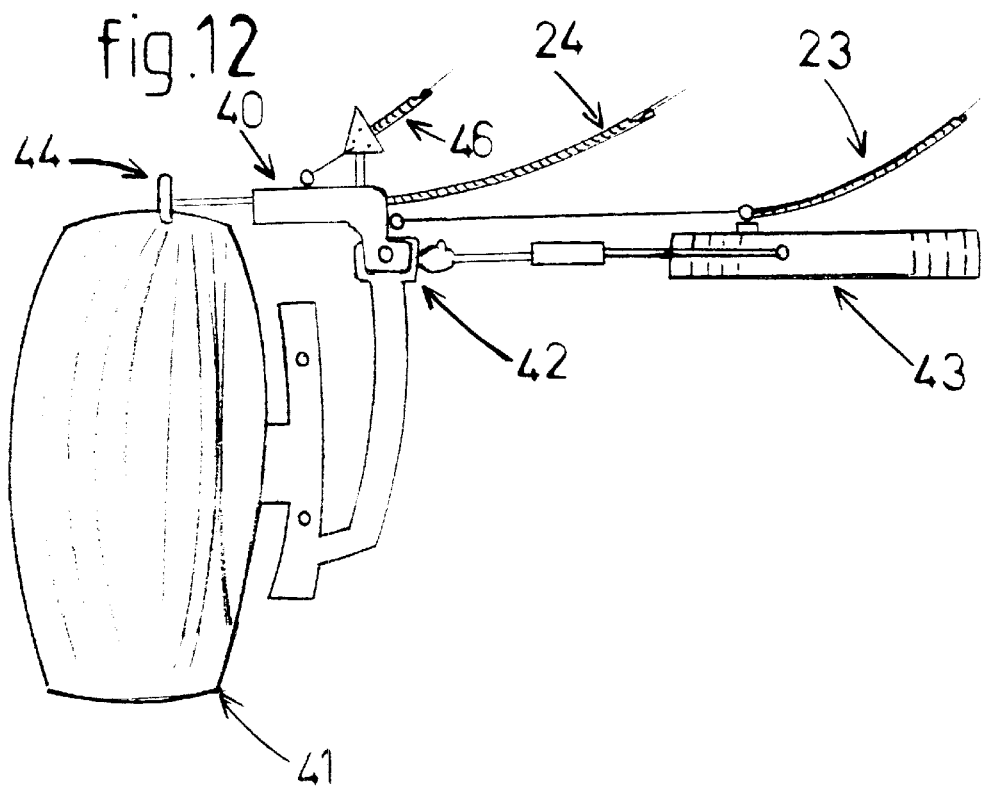

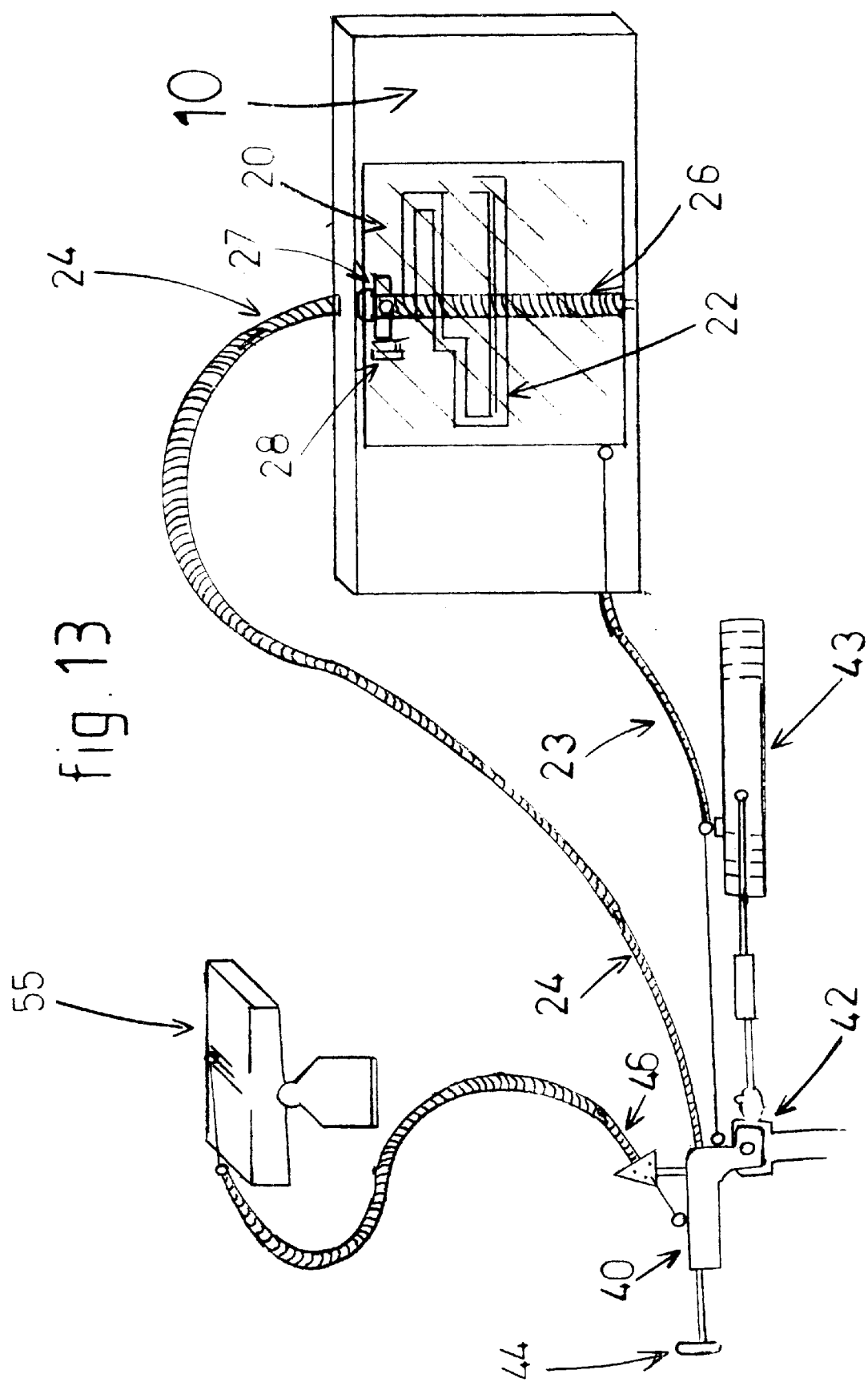

BACKUP AND PARALLEL PARKING ASSISTANT

BACKGROUND OF THE INVENTION

1. Field of the Invention

This invention relates generally to vehicles and specifically to an improved method for indicating simultaneous position of the steering wheels and distance traveled providing an accurate guide to the vehicle driver in the curbside parking of the vehicle.

2. Description of the Prior Art

Parallel parking involves skill and practice; it is probably the most difficult maneuver in the driving experience.

In view of this situation, there have been developed in the prior art devices to be aids to vehicle operators and provide guides for the parking of the vehicles. These other devices appear to be complicated to operate and/or may be inaccurate; also confusing to a vehicle operator when parallel parking a vehicle not so equipped. Hardy and Brink have devised various indicator devices for various vehicles which orient the position of the front wheels to the central axis of the vehicle. Biven has taken that work and improved it by adding a method to determine distance traveled. However, none of these actually inform the vehicle operator when and to what extent to turn the steering wheel and when and to what extent to move the vehicle.

SUMMARY OF THE INVENTION

The present invention remedies and overcomes all of the deficiencies and disadvantages of presently available parking guides by providing an apparatus which relays both the position of the steering wheels and simultaneously distance traveled. The vehicle operator simply observes the dashboard mounted device and manipulates the vehicle in accordance with the pre-drawn mapping.

It is a feature of the present invention to provide a position indicator device connected to the front steering wheels to mechanically indicate the position at all times of the wheels in reference to the central axis of the vehicle, this being part of a simultaneous method to assist the operator in parallel parking.

A further feature of the present invention is the provision of a position indicator for the front steering wheels along with a distance indicator device for informing the vehicle operator when to stop the vehicle, start the vehicle or turn the steering wheel.

BRIEF DESCRIPTION OF THE DRAWINGS

In the accompanying drawings forming a part of this specification, and in which like reference characters are employed to designate like parts throughout the same:

FIG. 1 is a front elevation view of a vehicle dashboard having the indicator device of the present invention mounted thereon;

FIG. 2 is a front elevation view of the indicator device with the indicator indicating the position of the diagrammatically illustrated vehicle steering wheels shown there beneath; and diagrammatically illustrated vehicle position at the start of the parallel parking process;

FIGS. 3 through 11 are front elevation views similar to FIG. 2 and illustrating the angled direction of the diagrammatically illustrated steering wheels and diagrammatically illustrated vehicle position relative to other vehicles in the parallel parking process;

FIG. 12 is a front view of the contact wheel (driver) assembly as mounted on the tie-rod end along with various cable connections; and FIG. 13 is a diagrammatic view illustrating the connection of the cables to components of the vehicle and the present invention for parallel parking operation.

DESCRIPTION OF THE PREFERRED EMBODIMENTS

Figure 7:
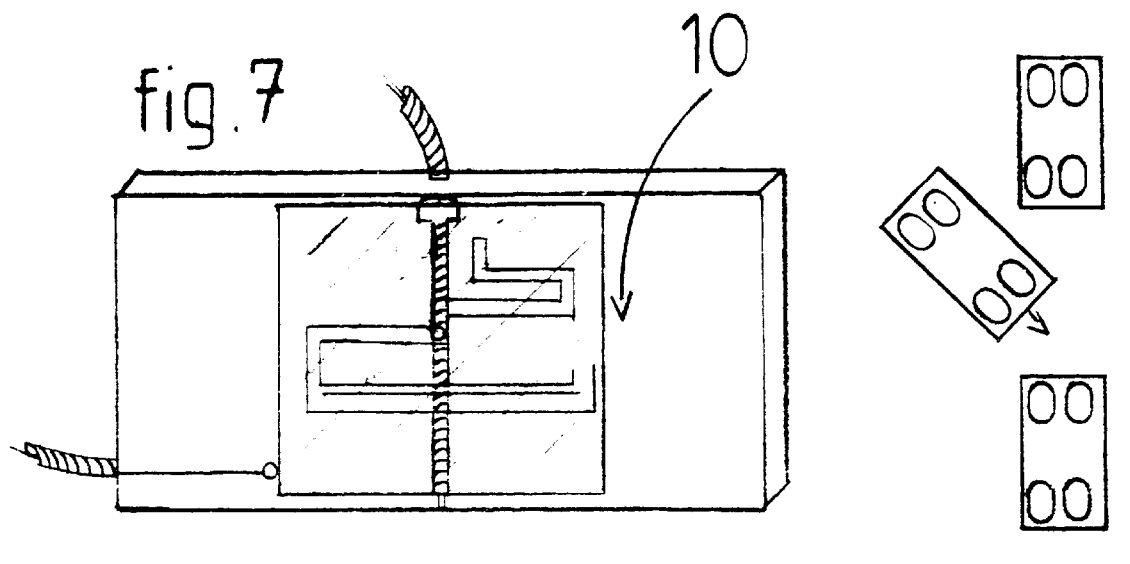
Figure 8:
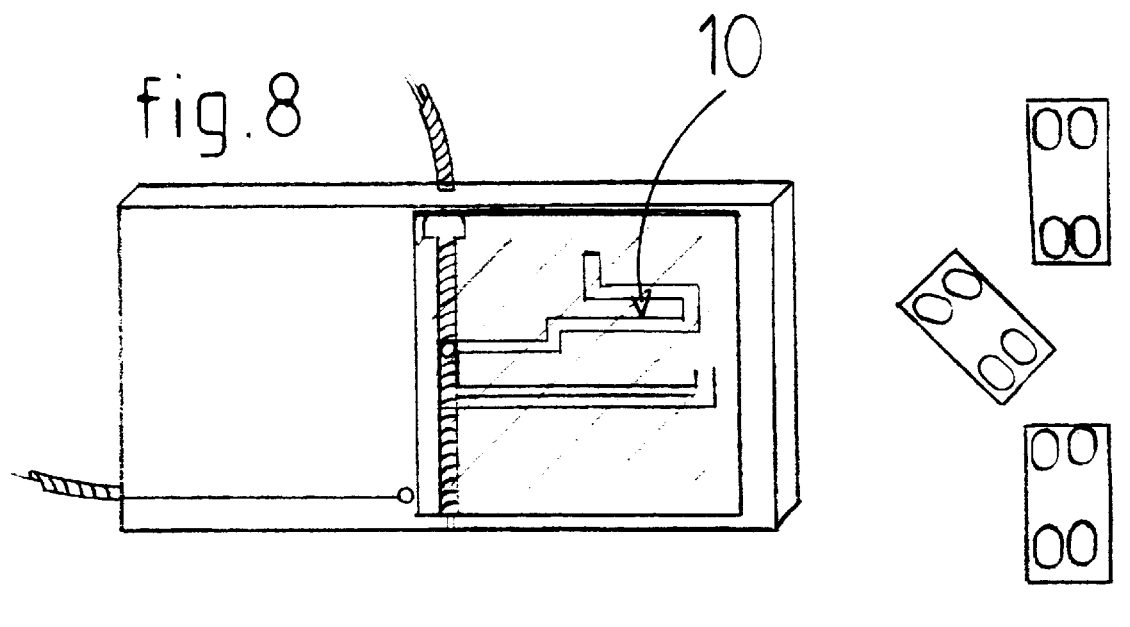

Referring now to the drawings in detail, in FIG. 2 there is illustrated an example of a preferred form of the apparatus for indicating simultaneously the position of the vehicle steering wheels and distance traveled, the device being constructed in accordance with the principles of the present invention and designated in its entirety by the reference number 10 and being shown in FIG. 1 mounted in a conventional dashboard 11 of a vehicle having normal instrumentation and a steering wheel 15.

The indicator apparatus 10 a housing having a front face having a width and a height. A transparent faceplate 20 will move either to the right or to the left depending upon the movement of the steering wheel. Directly beneath the transparent faceplate 20 exists a threaded rotating shaft 26 linked to the contact or driver wheel, shown in FIG. 12, via a rotating cable 24; a threaded nut assembly with a dot marker moves along this shaft. Also in reference number 10 fixed cable 23 connected to transparent faceplate 20 and the opposite end connected to contact wheel mechanism via tie-rod end, referring to reference number 20, transparent faceplate, it is composed of Plexiglas and has affixed thereto a pre-drawn mapping 22.

FIG. 3 through and including FIG. 11 show the actual diagrammatically illustrated movements of the steering wheel and motion of the vehicle (via reverse and forward) performed by the vehicle operator in the process of parallel parking. Movement of the steering wheel 15 left or right is translated via the motion of reference number 20 either to the left or to the right whereas movement of the vehicle backward or forward is translated via the movement of threaded nut assembly 27 which is moved by the rotating cable 24 which comes from contact wheel assembly 40.

As seen in FIG. 12, the contact wheel assembly 40 is affixed to the tie-rod end 42 and includes the driver wheel 44. Fixed cable 23 is affixed to the rack and pinion assembly 43; while the driver wheel 44 will, on command, make contact with vehicle tire 41. This command is electronically implemented thus causing fixed cable 46 to disengage thus creating contact.

FIG. 13 shows the components of the indicator apparatus including the engager unit 55 which is a motor driven solenoid that is activated by switch 28 to implement contact between the driver wheel 44 and the vehicle tire 41.

The present invention is not limited to this embodiment, but variations and modifications may be made without departing from the scope of the present invention.

What is claimed is:

1. An indicator device intended for installation in a vehicle and on a dashboard of the vehicle to provide visual indication of the orientation of the steering wheel relative to the central axis of the vehicle and simultaneously a visual indication of a distance traveled, the indicator device comprising:

a housing having a front surface, a moving transparent faceplate which is moveably attached to the front surface, a mapping on said faceplate which moves with said faceplate and which pictures a motion needed to parallel park the vehicle, a threaded rotatable shaft comprising a threaded nut assembly having a marker, said nut assembly moves along the threaded rotatable shaft, wherein said movement of said faceplate and said map is substantially orthogonal to said movement of said threaded nut assembly;

a flexible cable having two ends, one said end being attached to said faceplate, the other said end being adapted to connect to the vehicle tie-rod end, said flexible cable causes movement of said faceplate and is calibrated to correspond to movement of the vehicle steering wheel; and a contact wheel assembly having a rotatable wheel, said contact wheel assembly being designed to affix to the vehicle so that said rotatable wheel can contact a front wheel of the vehicle, said contact wheel assembly connecting to a rotatable cable, said rotatable cable connects to said threaded rotatable shaft and movement of said rotatable wheel causes the movement of said nut assembly with said marker, the movement of said nut assembly being calibrated to correspond to the reverse and forward motion of the vehicle.

\* \* \* \* \*